B. A. PENNOCK.
MOTOR WHEEL GRIP.
APPLICATION FILED OCT. 14, 1920.

1,369,264.

Patented Feb. 22, 1921.

INVENTOR
BERNARD A. PENNOCK
BY
ATTYS

UNITED STATES PATENT OFFICE.

BERNARD A. PENNOCK, OF TORONTO, ONTARIO, CANADA.

MOTOR-WHEEL GRIP.

1,369,264.   Specification of Letters Patent.   Patented Feb. 22, 1921.

Application filed October 14, 1920. Serial No. 416,999.

*To all whom it may concern:*

Be it known that I, BERNARD A. PENNOCK, of the city of Toronto, in the county of York, in the Province of Ontario, Canada, have invented certain new and useful Improvements in Motor-Wheel Grips, of which the following is a specification.

My invention relates to improvements in motor wheel grips and the object of the invention is to devise simple means readily attachable to an automobile wheel for lifting the wheel out of a rut or other similar depression in which the wheel is stuck and it consists essentially of the following arrangement and construction of parts as hereinafter more particularly explained.

In the drawings like characters of reference indicate the corresponding parts in each figure.

Figure 1:
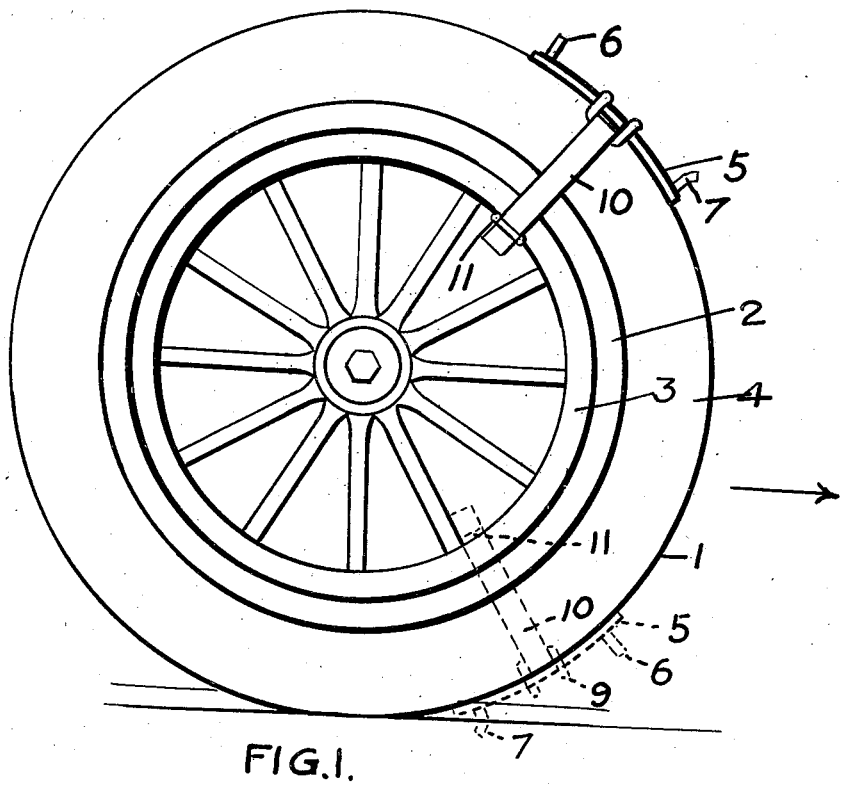
Figure 1 is a side elevation of an automobile wheel showing my device applied thereto.
Figure 3:
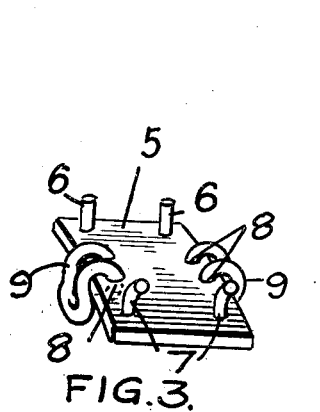
Fig. 3 is a perspective detail of my gripping device.
Figure 2:
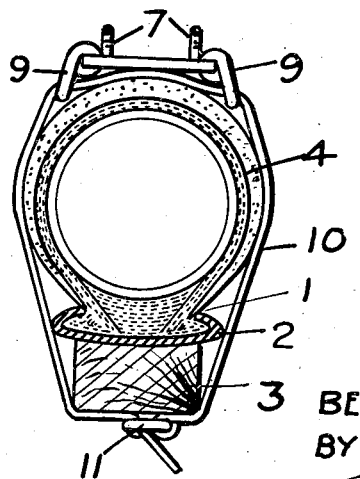
Fig. 2 is a cross section through the tire rim felly of a wheel and showing my device in position.

1 indicates an automobile wheel of which 2 is the rim, 3 the felly and 4 the tire. 5 indicates a plate which is flat crosswise and slightly arched longitudinally so as to fit the tread of the wheel. 8 indicates a perforation formed in the plate in proximity to the longitudinal edges. 9 indicates metal loops provided with eyes extending through the perforation 8 to connect the loops to the plate. 6 indicates pin projections extending outwardly from the plate at one end. The pins projections 6 are straight pins. 7 indicates pin projections extending outwardly from the plate in proximity to the outer end. The pin projections 7 are bent outward toward the end of the plate 5 so as to have a hook grip upon the ground as indicated clearly in the dotted position shown in Fig. 1. 10 indicates a strap which extends through the loops 9 between the plate 5 and tire 4. The free ends of the strap extend downward against each side of the tire and around the rim and felly and are connected together by means of a buckle 11, the strap 10 fitting between the spokes of the wheel.

When the wheel drops into a rut in the road and the driver cannot extricate his car therefrom he attaches his grip substantially in the position shown by full lines in the drawing. The car is then started and as the hook projections 7 pass beneath the wheel, they engage the ground at the bottom of the rut and lift the wheel onto the plate 5 supporting the wheel upon such plate. The strut 10 is then loosened, the wheel may then be turned and the car driven clear of the rut, the plate 5 supporting the lower peripheral portion of the tire tread above the level of the rut.

From this description it will be seen that I have devised a very simple means whereby an automobile may be freed when the wheels drop into a rut in the road or freed in other similar circumstances such as when the wheel engages in a grooved trackway.

What I claim as my invention is.

1. In an automobile wheel grip, a plate, straight pin projections extending from one end of the plate, and outwardly extending pin projections extending from the opposite side of the plate, and means for detachably securing the plate to the tread of the tire.

2. In a wheel grip, a plate, pin projections extending from the outer face of the plate, loops formed at each side of the plate, a flexible securing means extending through the loop beneath the plate and adapted to be fastened at its free ends around the felly of the wheel.

BERNARD A. PENNOCK.